(12) United States Patent
Corte, Jr. et al.

(10) Patent No.: US 6,557,577 B1
(45) Date of Patent: May 6, 2003

(54) THREADED UNION SAFETY DEVICE AND METHOD

(75) Inventors: Bobby J. Corte, Jr., Houma, LA (US); Durell Kraemer, Thibodaux, LA (US)

(73) Assignee: Cor-Val, Inc., Houma, LA (US)

( * ) Notice: Subject to any disclaimer, the term of this patent is extended or adjusted under 35 U.S.C. 154(b) by 0 days.

(21) Appl. No.: 09/885,322

(22) Filed: Jun. 19, 2001

(51) Int. Cl.$^7$ .......................... F16K 43/00; F16K 51/00
(52) U.S. Cl. ........................ 137/15.18; 137/315.02; 285/91
(58) Field of Search .................. 137/315.02, 315.27, 137/315.4, 557, 15.18; 285/81, 90, 91, 92

(56) References Cited

U.S. PATENT DOCUMENTS

| | | | |
|---|---|---|---|
| 2,078,402 A | | 4/1937 | McDonough et al. |
| 2,943,869 A | * | 7/1960 | Nordin .................. 285/90 |
| 3,331,396 A | | 7/1967 | Willis |
| 3,426,797 A | | 2/1969 | Baker |
| 4,705,062 A | * | 11/1987 | Baker .................. 137/315.02 |
| 4,921,281 A | * | 5/1990 | Taylor .................. 285/90 |
| 4,923,221 A | * | 5/1990 | Taylor .................. 285/81 |
| 4,926,898 A | | 5/1990 | Sampey |
| 5,065,787 A | | 11/1991 | Lochmann |
| 5,074,519 A | | 12/1991 | Pettus |
| 5,241,980 A | | 9/1993 | Corte |

OTHER PUBLICATIONS

Advertisement From Thornhill Craver for the Unibolt Coupling (6 pgs.), date unknown.

* cited by examiner

*Primary Examiner*—John Rivell
(74) *Attorney, Agent, or Firm*—E. Randall Smith

(57) ABSTRACT

A union assembly useful in a fluid flowstream includes a body portion, a pressure indicating device and a removable cover. The body portion includes a bore, an access opening and pressure indicating device cavity in fluid communication, and a first plurality of threads disposed around the access opening. The removable cover includes a passageway and a second plurality of threads disposed around the passageway. Engagement of the first and second pluralities of threads will secure the removable cover to the body portion for use of the union assembly without any additional mechanism connecting the removable cover with the body portion. When the union assembly is assembled, a cut-out portion on the removable cover is disposed at least partially around the pressure indicating device, whereby the pressure indicating device must be disengaged from the body portion before the removable cover may be disconnected.

13 Claims, 3 Drawing Sheets

THREADED UNION SAFETY DEVICE AND METHOD

CROSS REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

The present invention relates to safety apparatus and methods for opening unions used in fluid flowstreams. More particularly, the present invention relates to a threaded union that cannot be opened without first removing a pressure indicating, or relief, device and methods relating thereto.

Various types of fluid flow systems and components relating thereto, such as valves, closures and unions often contain internal pressure(s) that can cause injury to operators and damage to property if the valve, closure, union or another component is disconnected, or opened, without first releasing sufficient internal pressure. Safety devices have been proposed with the goal of preventing premature disconnection, disassembly or opening of the device prior to the release of sufficient pressure.

For example, choke valves are commonly used in high-pressure flow lines, pipelines and other systems in the petroleum industry, such as to regulate the flow of drilling fluid and petroleum, for well testing and well clean-up. It is often necessary or desirable to disassemble such choke valves for various reasons, such as to service the valve, flow line or petroleum well. A typical such choke valve includes a body portion and a removable portion attached thereto. The valve is disassembled by disconnecting the removable portion from the body portion. A releasable pressure bleeder device is often used with such choke valves to indicate the presence, or extent, of internal pressure and possibly also to enable the release of some or all of the internal pressure.

Safety devices have been proposed for choke valves. In U.S. Pat. No. 5,065,787 to Lochmann, for example, a choke valve safety device includes an external support bracket connectable between a removable choke bonnet nut and choke body. The Lochmann patent provides that the choke bonnet nut cannot be removed from the choke body until the support bracket is removed, which requires removal of a pressure bleeder device from the choke body. For another example, U.S. Pat. No. 5,241,980 to Corte, having a common assignee with the present application, discloses a choke valve safety device having an external C-shaped clamp plate for connecting a removable wing nut and the valve body to prevent removal of the wing nut until pressure within the bore of the valve is relieved. For yet another example, the UNIBOLT® coupling by Thornhill Craver includes a removable yoke nut engageable with a choke valve body with the use of interlocking tapered shelves, or lugs. The yoke nut and valve body are secured in place with an external T-head bolt. The yoke nut engages a removable pressure bleeder plug and cannot be disconnected from the valve body without first removing the T-head bolt and bleeder plug.

With respect to each of the above-cited references, it is important to understand that the features mentioned above are merely examples of features disclosed in the references. Each reference has numerous other features in addition to the features mentioned herein. The additional features can be readily understood from a thorough review of each respective reference. The brief discussion above is included only to introduce the subject matter of the references and not to fully distinguish the same from the present invention. Therefore, it is the patent applicant's intent that the brief remarks above about the cited references not, in any way, limit or affect the scope of any of the appended claims. A comparison of any of the above-cited references with the invention of any of the appended claims should involve a comparison of all features of the cited reference together as compared to the entirety of the selected claim(s).

In considering existing technology for opening unions used in fluid flowstreams, there remains a need for safety apparatus and/or methods having one or more of the following attributes: an apparatus that does not require additional components; an apparatus that does not require additional external components; an apparatus that does not require bulky components; an apparatus that does not require complex components; an apparatus that is generally reliable in preventing inadvertent, or undesirable, opening of the union; an apparatus that requires, or occupies, minimal additional space in the union, or area within which the union is located; apparatus and methods that can be implemented by modifying, or retrofitting existing unions; apparatus and methods that, in use, do not require additional positive action; an apparatus that adds little or no weight to the union; apparatus, the components of which can be mass-produced and interchangeable; an apparatus that is cost effective to manufacture, assemble and use; an apparatus that is simple and durable in construction and use.

BRIEF SUMMARY OF THE INVENTION

In accordance with the present invention, certain embodiments involve a union assembly useful in a fluid flowstream and having a body portion, a pressure indicating device and a removable cover. The body portion includes a bore, an access opening and a pressure indicating device cavity in fluid communication. The body portion further includes a first plurality of threads disposed around the access opening. The pressure indicating device cavity is disposed proximate to the first plurality of threads. The pressure indicating device is releasably engageable within the pressure indicating device cavity. The removable cover includes a passageway and a second plurality of threads disposed around the passageway. Engagement of the first and second pluralities of threads will secure the removable cover in connection with the body portion for use of the union assembly without the need for any additional mechanism connecting the removable cover with the body portion. The removable cover further includes a cut-out portion disposed proximate to the second plurality of threads, whereby when the removable cover and the pressure indicating device are engaged with the body portion, the cut-out portion is disposed at least partially around the pressure indicating device, and the pressure indicating device must be disengaged from the body portion before the removable cover may be disconnected from the body portion.

The first and second pluralities of threads may each include a beginning thread, whereby the start points of the beginning threads of the first and second pluralities of threads are disposed on the body portion and the removable cover, respectively, in such a manner as to enable the cut-out portion of the removable cover to align over the pressure indicating device cavity of the body portion when the removable cover and the body portion are threadably engaged. The pressure indicating device cavity may be located on the circumference of the body portion relative to the start point of the beginning thread of the first plurality of threads, and the cut-out portion may be located on the removable cover relative to the start point of the beginning thread of the second plurality of threads to enable the cut-out portion of the removable cover to align over the pressure indicating device cavity of the body portion when the removable cover and the body portion are threadably engaged. Further, the removable cover may be threadably engaged and disengaged with the body portion by pneumatic actuation.

A plurality of the body portions and a plurality of the removable covers may be included, whereby any among the plurality of removable covers is threadably engageable with any among the plurality of body portions and each cut-out portion of the plurality of removable covers will be disposed over the respective pressure indicating device cavity of the body portion with which the respective removable cover is engaged. The cut-out portion may be formed to allow variation in the location of the start point of the beginning thread of each of the first and second pluralities of threads. The removable cover may be a wing nut and the cut-out portion may be a recess that occupies approximately sixty degrees of the circumference of the wing nut. The union assembly may be useful in a high pressure fluid flowline. The union assembly may be a choke valve, the body portion being a choke valve body and the removable cover being a wing nut. The pressure indicating device may be a bleeder plug. The union assembly may be useful in a heating apparatus and/or during petroleum well cleanup operations.

In another embodiment, a choke valve safety device is useful in a high pressure fluid flow line and includes a valve body having a plurality of male threads and a pressure vent plug orifice disposed in the valve body proximate to the plurality of male threads. A wing nut having a plurality of female threads threadably engageable with the plurality of male threads of the valve body is also included, the wing nut further having a recess proximate to the plurality of female threads. The wing nut at least partially surrounds the pressure vent plug orifice when the wing nut and the valve body are threadably engaged. No further connection mechanism is necessary for connecting the wing nut with the valve body.

Certain embodiments involve a method for opening a union assembly disposed in a high pressure fluid flowline with the use of a union body having a pressure indicating device cavity, a pressure indicating device engageable in the pressure indicating device cavity, a removable cover threadably engageable with the union body that includes threadably engaging the removable cover with the union body and installing the pressure indicating device in the pressure indicating device cavity. The pressure indicating device is loosened from the pressure indicating device cavity and pressure is released from the union body portion. The pressure indicating device is removed and the removable cover is threadably disengaged from the body portion.

Certain embodiments involve a method for forming a union assembly that cannot be opened prior to releasing sufficient pressure in the union assembly, the union assembly having a union body and a removable cover, the union body having a bore and an access opening, the removable cover having a passageway, includes forming a pressure indicating device cavity in the union body and a cut-out portion in the removable cover. A plurality of male threads is formed around the access opening of the union body proximate to the pressure indicating device cavity, the start point of the beginning thread of the plurality of male threads being located on the union body between approximately 165 degrees and approximately 195 degrees from the centerline of the pressure indicating device cavity to enable alignment of the cut-out portion of the removable cover over the pressure indicating device cavity when the removable cover and the union body are threadably engaged. A plurality of female threads is formed around the passageway of the removable cover proximate to the cut-out portion, the start point of the beginning thread of the plurality of female threads being located on the removable cover between approximately 165 degrees and approximately 195 degrees from the centerline of the cut-out portion to enable alignment of the cut-out portion over the pressure indicating device cavity of the union body when the removable cover and the union body portion are threadably engaged.

Accordingly, the present invention includes features and advantages which enable it to substantially advance the technology associated with unions that can be disassembled or opened. Characteristics and advantages of the present invention described above, as well as additional features and benefits, will be readily apparent to those skilled in the art upon consideration of the following detailed description of preferred embodiments and referring to the accompanying drawings.

BRIEF DESCRIPTION OF THE DRAWINGS

For a detailed description of the preferred embodiments of the invention, reference will now be made to the accompanying drawings wherein.

DETAILED DESCRIPTION OF PREFERRED EMBODIMENTS

Figure 1:
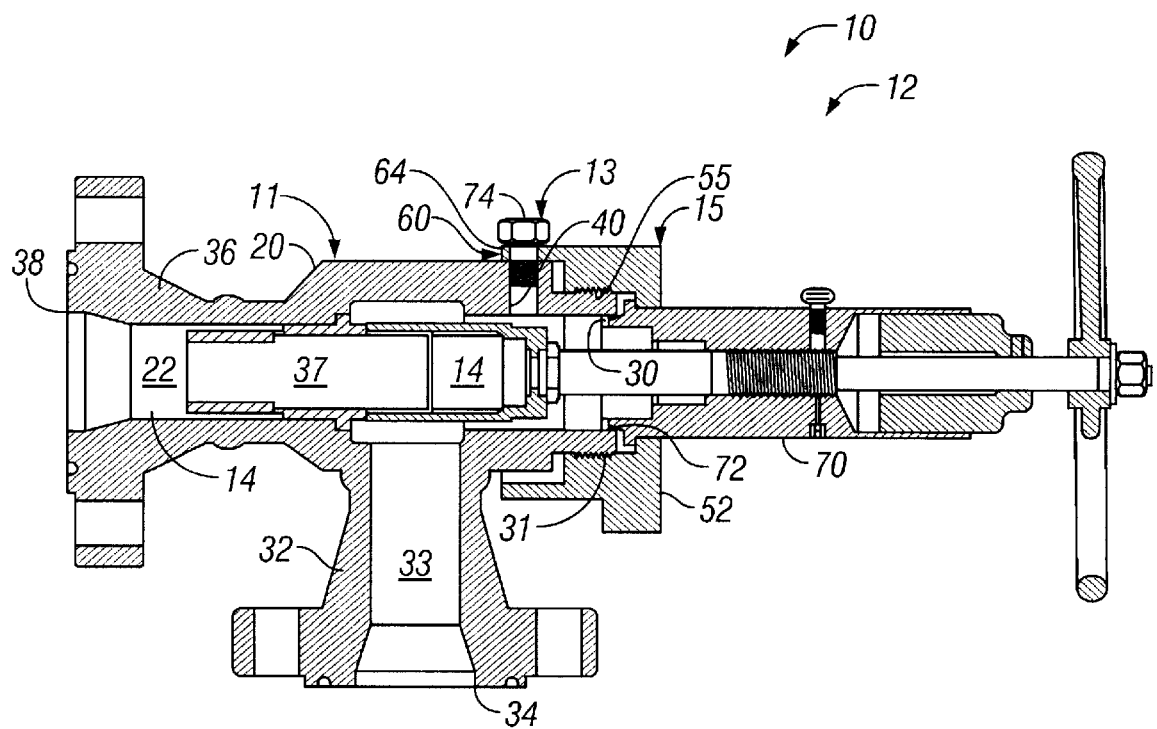
FIG. 1 shows a cross-section of a choke valve that includes an embodiment of a threaded union safety device made in accordance with the present invention.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

The contents of this "Detailed Description of Preferred Embodiments", the accompanying "Abstract", "Brief Description of the Drawings", "Brief Summary of the Invention" and "Background of the Invention" sections and appended FIGS. 1–6 are not intended and should not be deemed to limit the scope or construction of any of the appended claims or claim language, except and only to the extent as may be expressly provided in the form of a specific definition contained in this Detailed Description section for particular language that may appear in one or more of the appended claims, such specific definition(s) including the phrase "the term '__' means". Further, as used herein and throughout the various portions of this specification, the terms "invention", "present invention" and variations thereof are used to generally refer to subject matter that may be encompassed by one or more of the appended claims, but not as a limitation of any claims. These terms are not intended to, and do not, mean the claimed invention of any particular claim(s), or of all of the appended claims. Thus, the use herein of the terms "invention", "present invention" and variations thereof should not be used to limit the construction or scope of any of the appended claims.

Figure 2:
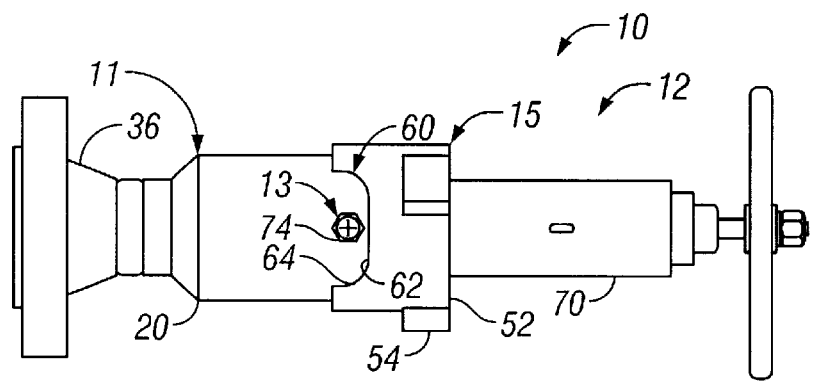
FIG. 2 shows a top view of the valve shown in FIG. 1.

Referring initially to FIGS. 1 and 2, the present invention generally involves a union assembly 10 that includes a body portion 11 having a bore 14 in fluid communication with an access opening 30 and a pressure indicating device cavity 40. As used herein and throughout the various portions of this patent specification and the appended claims, the terms "union", "union assembly" and variations thereof means any union, closure, valve or like device through which pressurized fluid may flow and which can be disassembled, disconnected or opened. A removable cover 15 is threadably connectable over the access opening 30 and a pressure indicating device 13 is releasably engageable in the cavity 40.

The pressure indicating device 13 is typically useful for indicating the existence and/or extent of pressure in the bore 14 and possibly also enabling the release of some or all such pressure. As used herein and in the appended claims, the term "pressure indicating device" and variations thereof thus means a device capable of indicating the existence and/or extent of pressure in an area inside a union, enabling the release of some or all such pressure, other pressure related functions or any combination thereof. The removable cover 15 includes a cut-out portion 60 that at least partially surrounds the cavity 40 (and the pressure indicating device 13) when the removable cover 15 is fully engaged with the body portion 11. When the aforementioned components are assembled, the presence of the pressure indicating device 13 will prevent removal of the cover 15 until the device 13 is removed from the cavity 40. The present invention thus provides a mechanical method of preventing the opening of a threaded union assembly 10 without first releasing, or venting, internal pressure(s) in the union 10.

In the particular embodiment of FIG. 1, the union assembly 10 is a choke valve 12. The choke valve 12 shown in FIGS. 1–6 and described herein is provided for illustrative purposes only. Further, the present invention is not limited to use with, or in, choke valves, such as choke valve 12, but can be used with any suitable type or configuration of union.

Figure 3:
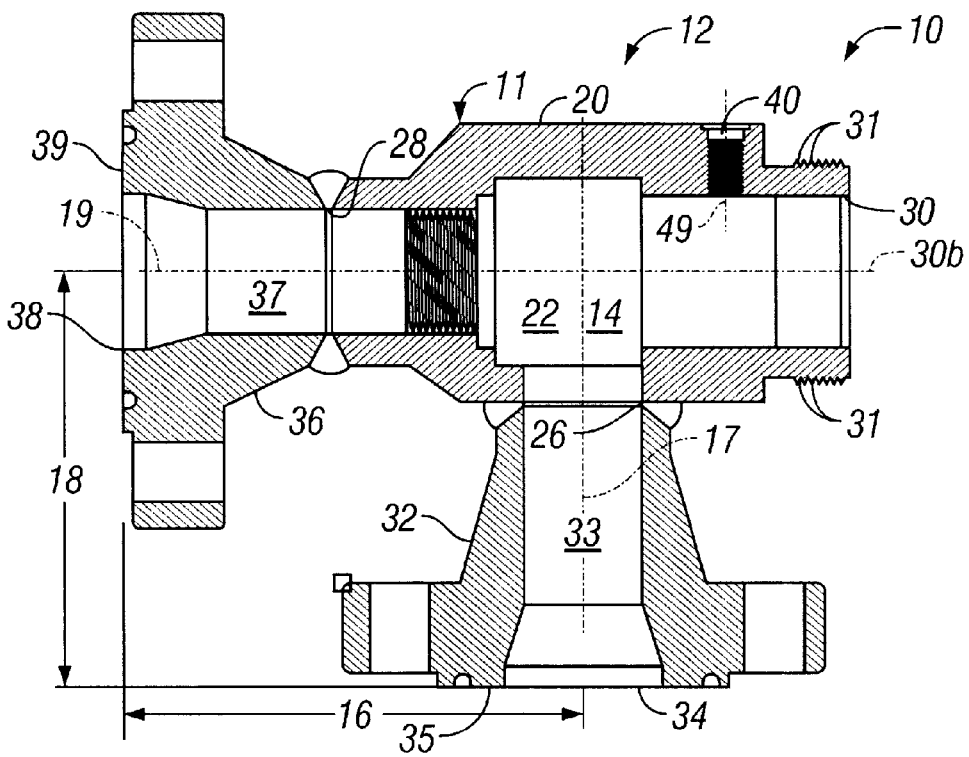
FIG. 3 shows an isolated cross-section of the valve body and flanged connections of the valve shown in FIG. 1.

Referring to FIGS. 1 and 3, the illustrated choke valve 12 includes a valve body 20 having an internal bore 22 that communicates with inlet and outlet openings 26, 28, an access opening 30 and a pressure indicating device cavity 40. Flanged connections 32, 36 may be connected with the valve body 20, if desired, such as to allow the choke valve 12 to be connected to piping systems, pipe spools, oil well Christmas tree assemblies or other devices (not shown). The illustrated flanged connections 32, 36 have inlet and outlet bores 33, 37 with openings 34, 38, respectively, which communicate with the bore 22 of the valve body 20 via openings 26, 28, respectively.

The choke valve 12 can be of any suitable size. For example, the embodiment shown in FIG. 3 is known in the art as a 2 inch nominal choke valve. The illustrated valve 12 has a distance 16 from the centerlines 17 of the inlet openings 26, 34 to the outer surface 39 of the flanged connection 36 of approximately 11.38 inches, and a distance 18 from the centerlines 19 of the outlet openings 28, 38 to the outer surface 35 of the flanged connection 32 of approximately 9.88 inches. Likewise, the valve body 20 can be of any suitable size. The valve body 20 shown in FIG. 4, for example, is of a standard size, having a length 20a of approximately 13 inches and an outer diameter 20b of approximately 7 inches. The diameters 26a, 28a of the inlet and outlet openings 26, 28 of this embodiment are each approximately 3.06 inches. Different, or additional, dimensions of the choke valve 12 and valve body 20 which are or become known in the art may be utilized. These and other components, arrangements and operation of conventional choke valves are more fully described in prior art patents and publications, such as U.S. Pat Nos. 2,078,402 to McDonough et al., 3,426,797 to Baker and 3,331,396 to Willis, each of which is hereby incorporated by reference herein in its entirety.

Figure 4:
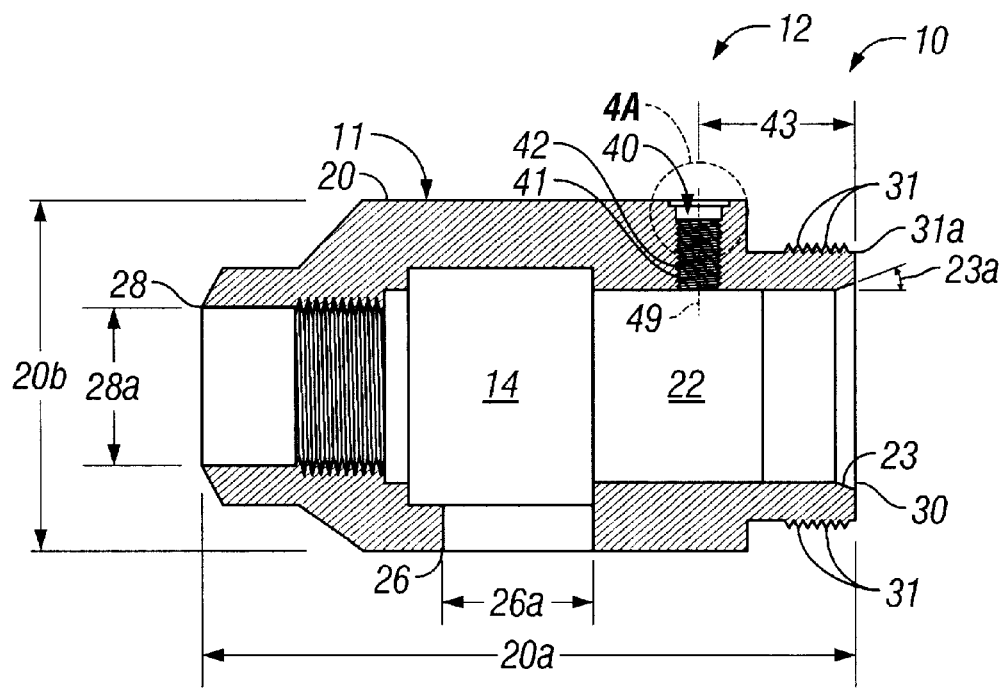
FIG. 4 shows an isolated cross-section of the valve body of the valve shown in FIG. 1.
Figure 5:
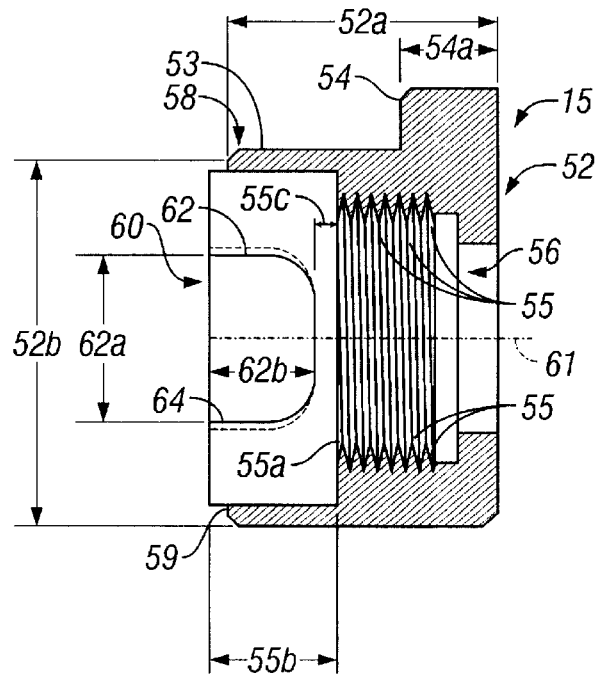
FIG. 5 shows an isolated cross-section of the removable cover of the valve shown in FIG. 1.

Still referring to the exemplary valve body 20 of FIG. 4, a series of male threads 31 is formed around the access opening 30 for attachment of the removable cover 15 (FIG. 5). The threads 31 may be of any suitable type, size and configuration, as is, or become, known in the art. For example, the embodiment of FIG. 4 shows five (5 each) ¼"–3 stub acme male threads. In accordance with the present invention, the start point (not shown) of the lead, or beginning, male thread 31a disposed around the access opening 30 is particularly located on the circumference of the valve body 20 so that the pressure indicating device cavity 40 will align with the cut-out portion 60 (FIG. 5) of the wing nut 52 when the choke valve 12 is assembled. For example, the start point of the beginning male thread 31a in the embodiment of FIGS. 1 and 4 is located approximately 180 degrees from the centerline 49 of the pressure indicating device cavity 40. However, the present invention is not limited to this particular configuration, and any other suitable relative location of the male thread 31a and cavity 40 may be used.

Figure 4A:
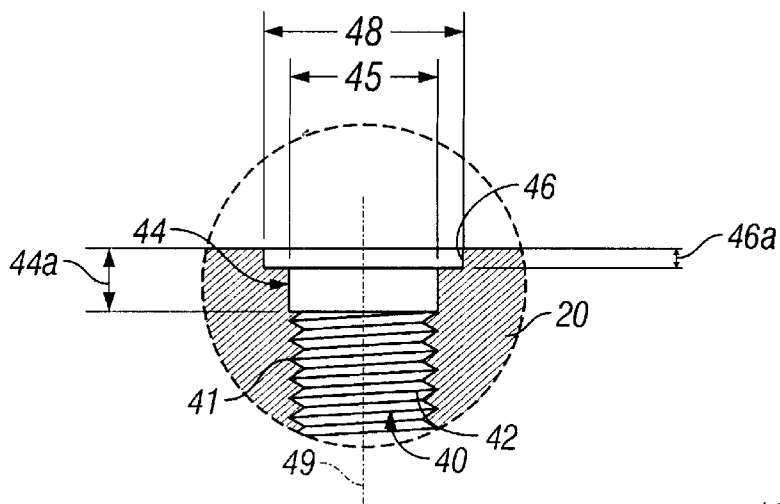
FIG. 4A shows an exploded cross-section of the pressure indicating device cavity shown in FIG. 4.

The pressure indicating device cavity 40 may be of any suitable shape, size and configuration. For example, the cavity 40 illustrated in FIGS. 4 and 4A has a diameter 45 of approximately 0.76 inches and includes a non-threaded portion 44 having a depth 44a of approximately 0.36 inches. The non-threaded portion 44 includes an upper wide section 46 having a depth 46a of approximately 0.12 inches and a diameter, or width, 48 of approximately 1.06 inches. Female threads 42 (or any other suitable matable mechanism) are formed in the cavity wall 41 for engagement with the pressure indicating device 13 (FIG. 1), as is known in the art.

Referring to FIGS. 3 and 4, the pressure indicating device cavity 40 is preferably disposed in the valve body 20 proximate to the access opening 30 and the male threads 31. In the embodiment of FIG. 4, for example, the distance 43 between the centerline 49 of the cavity 40 and the start point (not shown) of the beginning male thread 31a is approximately 3.13 inches. If desired, the cavity 40 may be disposed as close to the threads 31 as possible and practical (without violating safety, regulatory or industry requirements or standards), such as to minimize the necessary length of the removable cover 15. Further, the cavity 40, in accordance with the present invention, is particularly located on the circumference of the valve body 20 to ensure alignment with the cut-out portion 60 (FIGS. 1, 2) of the removable cover 15 when these components are assembled. In the embodiment of FIG. 3, for example, the centerline 49 of the cavity 40 is generally in the same linear plane as the centerline 30b of the access opening 30 and the centerlines 17, 19 of the inlet and outlet openings 26, 28, respectively.

Referring again to FIGS. 1 and 2, the illustrated pressure indicating device 13 is a bleeder, or vent, plug 74 threadably engageable in the cavity 40 and capable of indicating the existence of pressure in the bore 22 and allowing the release of such pressure, as is known in the art. However, the device 13 may take any other suitable structure, configuration and form. Further, the device 13 may only indicate the existence of pressure in the bore 22, or possess other functionality. Moreover, the present invention and appended claims are in way limited by the pressure indicating device 13.

Still referring to FIGS. 1 and 2, the removable cover 15 of the exemplary choke valve 12 is a wing nut 52 that is threadably, releasably engageable with the valve body 20. However, the removable cover 15 may be any other suitable component or device, such as a union nut, hammer nut or the like, as is or becomes known in the art. The exemplary wing nut 52 is shown disposed around a bonnet 70, as is known in the art, but could be disposed around any other suitable component, such as, for example, a blank cap (not shown). Further, the removable cover 15 or wing nut 52 need not be disposed around another component, as this aspect of the valve 12 has no bearing upon the present invention.

Figure 6:
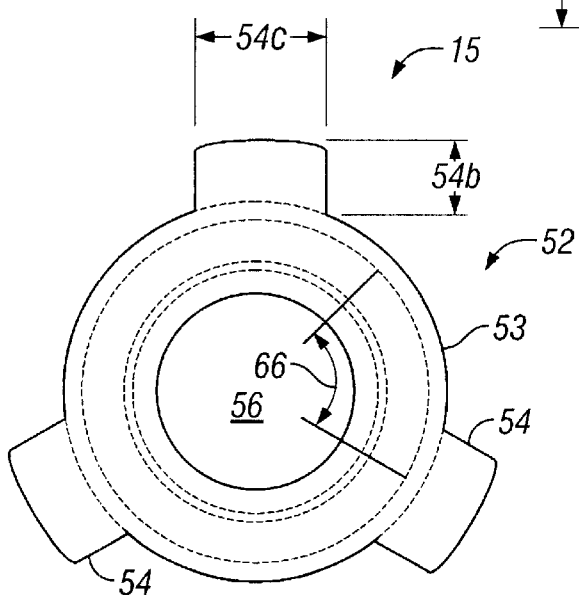
FIG. 6 is a top view of the removable cover of FIG. 5.

Now referring to FIGS. 5 and 6, the exemplary wing nut 52 has a nut body 53 and three ears 54 extending therefrom, as is known in the art. The wing nut 52 and ears 54 (when included) may have any suitable shape, dimensions and configuration. In the illustrated embodiment, for example, the wing nut 52 has a length 52a of approximately 5.50 inches and an outer diameter 52b of approximately 7.88 inches (not including any of the ears 54). Each ear 54 of this embodiment has a thickness 54a of approximately 2.00 inches, a length 54b of approximately 1.31 inches and a width 54c of approximately 2.50 inches. The ears 54 are shown spaced evenly around the circumference of the wing nut 52 and are useful as is or becomes known in the art, such as for gripping and rotating the wing nut 52. However, there may any other suitable quantity and configuration of ears 54, or no ears 54. The presence, quantity and configuration of ears 54 in now way limits the present invention.

As described above, the removable cover 15, such as the wing nut 52, is threadably removable from the union assembly 10 (FIG. 1). The use of a threaded connection may provide or allow for one or more benefits, such as providing reliability of the connection between the removable cover 15 and the body portion 11 of the union assembly 10, enabling modification of existing removable covers 15 for use in accordance with the present invention, enabling interchangeability of same-size removable covers and union bodies made in accordance with the present invention and others.

Still referring to FIGS. 5 and 6, the removable cover 15 includes a cut-out portion 60 that will be adjacent to, or partially surrounding, the pressure indicating device 13 (FIGS. 1, 2) when the union 10 is assembled. In accordance with the present invention, the cut-out portion 60 is particularly located on the circumference of the cover 15 so that it will align over the pressure indicating device cavity 40 when the union 10 is assembled. In the embodiment of FIGS. 5 and 6, for example, the cut-out portion 60 is a recess 62 formed in the end 58 of the wing nut 52. The illustrated recess 62 extends from the edge 59 of the end 58 to a location proximate to a beginning female thread 55a, as will be described further below. Thus, when the exemplary wing nut 52 is fully connected to the valve body 20, the recess 62 will align over the cavity 40 in the valve body 20, and the lip 64 (FIGS. 2 and 5) of the recess 62 will partially surround the cavity 40.

The removable cover 15 also includes a series of female threads 55 formed around a passageway, or bore 56, and engageable with the male threads 31 (FIG. 1) of the valve body 20. The threads 55 may be of any suitable type, size and configuration. For example, five (5 each) ¼"–3 stub acme 2G female threads may be used. The female threads 55, in accordance with the present invention, are particularly located on the removable cover 15 relative to the cut-out portion 60. For example, the start point (not shown) of the lead, or beginning, female thread 55a of the embodiment of FIG. 5 is disposed a distance 55b of approximately 2.19 inches from the edge 59 of the end 58 of the wing nut 52, and a distance 55c of approximately 0.51 inches from the back of the cut-out portion 60. Further in accordance with the present invention, the start point (not shown) of the lead, or beginning, female thread 55a is particularly located around the circumference of the bore 56 so that the cut-out portion 60 will align over the pressure indicating device cavity 40 when the union 10 is assembled. For example, the start point of the lead thread 55a in the embodiment of FIG. 5 is located approximately 180 degrees from the centerline 61 of the cut-out portion 60. However, the present invention is not limited to this particular configuration, and any other suitable relative location of the threads 55 may be used.

Referring again to FIG. 5, the cut-out portion 60, such as the recess 62, can have any suitable shape and dimensions. If desired, the recess 62 can be configured to allow some variation in the precise location of the beginning male and female threads 31a, 55a. In the embodiment of FIGS. 5 and 6, for example, the recess 62 has a width 62b of approximately 1.68 inches, a diameter, or length, 62a of approximately 3.93 inches, and occupies approximately 60 degrees (reference numeral 66, FIG. 6) on the circumference of the wing nut 52. This configuration allows for at least approximately 20 degrees of variation in the precise location of the respective start points of the beginning female thread 55a around the circumference of the bore 56 and the beginning male thread 31a (FIG. 4) on the circumference of the valve body 20. The recess 62 may also be configured to match the shape of an adjacent, exposed portion of the pressure indicating device 13 (FIGS. 1 and 2) when the valve 12 is assembled, such as to minimize damage from contact of these components. In the embodiment of FIG. 5, for example, the lip 64 is formed with a 1 inch radius to match the diameter of an adjacent hex portion (not shown) of the vent plug 74 (FIG. 1). However, neither of these particular features is necessary for the present invention.

The illustrated choke valve 12 includes various other components for its use and operation as are, or become, know in the art. For example, referring to the exemplary valve body 20 of FIG. 4, if desired, a portion of the wall 23 of the bore 22 adjacent to the access opening 30 may be sloped at a precise angle 23a to enable placement in the bore 22 of one or more seals 72 (FIG. 1) to achieve the desired, required or necessary sealing between the valve body 20 and bonnet 70 (FIG. 1) or other component, as is or becomes known in the art. The seal 72 may be a standard seal for use in choke valves, as is or becomes known in the art. However, this and other additional features are not limiting upon the present invention.

Referring again to FIG. 1, the various components of the union 10 described above may, if desired, be constructed without the need for special castings or forgings. Moreover, the present invention is not limited by the method of manufacture of the components. Further, the union components described above may be constructed of any suitable materials that are, or become, known in the art, and the present invention is likewise not limited by such material construction. In addition, it should be understood that all of the sample dimensions and other numerical values provided herein are approximations and examples only and are not limiting, in any manner, upon the present invention or the appended claims.

Referring again to FIGS. 1 and 2, in accordance with the present invention, the union 10 is assembled by threadably connecting and fully engaging the removable cover 15 with the body portion 11. The pressure indicating device 13 is then installed in the cavity 40. Thereafter, the cover 15 cannot be removed during normal operations without first removing the pressure indicating device 13. Thus, to open or provide access to the union assembly 10 by removing the cover 15, the pressure indicating device 13 must first be removed.

In use of the embodiment shown in FIGS. 1 and 2, for example, the choke valve 12 is assembled by screwing the wing nut 52 onto the valve body 20 around the access opening 30. The wing nut 52 is sufficiently secured to the valve body 20 to form a seal around the opening 30, as is known in the art. The vent plug 74 is then screwed into the cavity 40. To disassemble or provide access inside the exemplary valve body 20 by removing the wing nut 52, the vent plug 74 must first be removed. The vent plug 74 thus acts as a pin that prevents the wing nut 52 from being rotated more than a minimal amount and, thus, the choke valve 12 from being opened. When the vent plug 74 is unseated from the cavity 40 after use of the valve 12, some pressure(s) from trapped gas and/or liquid in the choke valve 12 will normally escape or vent from the cavity 40, as is known in the art. In the exemplary embodiment, for example, this occurs after approximately one-half to two turns of the vent plug 74. However, this configuration is not required.

Typically, the escaping gas and/or liquid provides a visual and/or audible warning of the existence of internal pressure. To remove the vent plug 74, the internal pressure must be further, or fully, released from the choke valve 12. This can be done in any suitable manner. In the preferred embodiment, pressure is released by continued venting through the vent plug 74 and cavity 40. In other embodiments, the vent plug 74 can be re-seated in the cavity 40 and other methods of releasing or venting the pressure may be utilized, as is or become known in the art. It should be understood, however, that the use and operation of the vent plug 74 and other techniques for venting pressure from the union 10 are in now way limiting upon the present invention or the appended claims. After the pressure is completely or sufficiently released, the vent plug 74 may be fully disengaged from the cavity 40 and the wing nut 52 removed from the valve body 20. Any of the above acts may be automated, such as with pneumatic or electrical mechanisms.

It should be understood that exemplary methods of operation of the above-described embodiments and other embodiments of the present invention need not include all of the features and operations described above, and such operations need not be performed in any particular order, such as the order provided above, unless specified. Further, the methods of the present invention do not require use with the particular embodiments shown and described in the present specification, such as the exemplary wing nut 52 and valve body 20, but are equally applicable with any other suitable structure, form and configuration of components. In addition, in all cases, extreme caution must be used in manufacturing, handling, assembling, using, and disassembling any union made, or used, in accordance with the present invention. The design, assembly and use of a union in accordance with this patent specification and the present invention in no way replaces the thorough investigation of and compliance with all regulatory, safety, technical, industry and other requirements, guidelines and safety procedures.

Preferred embodiments of the present invention are thus well adapted to carry out one or more of the objects of the invention. Further, the apparatus and methods of the present invention offer advantages over the prior art that have not been specifically addressed herein but are, or will become, apparent from the description herein, the appended drawings and claims. In addition, it should also be understood that certain features and subcombinations of the present invention are of utility and may be employed without reference to other features and subcombinations. This is contemplated and within the scope of the appended claims.

While preferred embodiments of this invention have been shown and described, many variations, modifications and/or changes of the apparatus and methods of the present invention, such as in the components, details of construction and operation, arrangement of parts and/or methods of use, are possible, contemplated by the applicant, within the scope of the appended claims, and may be made and used by one of ordinary skill in the art without departing from the spirit or teachings of the invention and scope of appended claims. Because many possible embodiments may be made of the present invention without departing from the scope thereof, it is to be understood that all matter herein set forth or shown in the accompanying drawings is to be interpreted as illustrative and not limiting. Accordingly, the scope of the invention and the appended claims is not limited to the embodiments described and shown herein.

What is claimed is:

1. A union assembly useful in a fluid flowstream, the union assembly comprising:

a body portion including a bore extending therethrough, said body portion further including an access opening and a pressure indicating device cavity both in communication with said bore, said body portion further including a first plurality of threads disposed around said access opening, said pressure indicating device cavity being disposed proximate to said first plurality of threads, a pressure indicating device releasably engageable within said pressure indicating device cavity, and a removable cover including a passageway and a second plurality of threads disposed around said passageway, said second plurality of threads engageable with said first plurality of threads of said body portion, whereby engagement of said first and second pluralities of threads will secure said removable cover in connection with said body portion for use of the union assembly without any additional mechanism connecting said removable cover with said body portion, said removable cover further including a cut-out portion disposed proximate to said second plurality of threads, whereby when said removable cover and said pressure indicating device are engaged with said body portion, said cut-out portion is disposed at least partially around said pressure indicating device and said pressure indicating device must be disengaged from said body portion before said removable cover may be disconnected from said body portion, wherein said first and second pluralities of threads each include a beginning thread, whereby the start points of said beginning threads of said first and second pluralities of threads are located on said body portion and said removable cover, respectively, so as enable said cut-out portion of said removable cover to align over said pressure indicating device cavity of said body portion when said removable cover and said body portion are threadably engaged.

2. The union assembly of claim 1 wherein said pressure indicating device cavity is located on the circumference of said body portion relative to said access opening and the start point of said beginning thread of said first plurality of threads and said cut-out portion is located on said removable cover relative to the start point of said beginning thread of said second plurality of threads to enable said cut-out portion of said removable cover to align over said pressure indicating device cavity of said body portion when said removable cover and said body portion are threadably engaged.

3. The union assembly of claim 2 further including a plurality of said body portions and a plurality of said removable covers, wherein any among said plurality of removable covers is threadably engageable with any among said plurality of body portions, whereby each said cut-out portion of said plurality of removable covers will be disposed over said respective pressure indicating device cavity of said body portion with which said respective removable cover is engaged.

4. The union assembly of claim 2 wherein said cut-out portion is formed to allow variation in the location of the start point of said beginning thread of each of said first and second pluralities of threads.

5. The union assembly of claim 4 wherein said removable cover is a wing nut and said cut-out portion is a recess that occupies approximately sixty degrees of the circumference of said wing nut.

6. The union assembly of claim 2 wherein the union assembly is useful in a high pressure fluid flowline.

7. The union assembly of claim 6 wherein the union assembly is a choke valve, said body portion is a choke valve body and said removable cover is a wing nut.

8. The union assembly of claim 7 wherein said pressure indicating device is a bleeder plug.

9. The union assembly of claim 1 wherein the union assembly is useful in a beating apparatus.

10. The union assembly of claim 2 wherein the union assembly is useful during petroleum well cleanup operations.

11. A choke valve safety device useful in a high pressure fluid flow line, the choke valve safety device comprising:

a valve body having a plurality of male threads, a pressure vent plug orifice disposed in said valve body proximate to said plurality of male threads, and a wing nut having a plurality of female threads threadably engageable with said plurality of male threads of said valve body, said wing nut further having a recess proximate to said plurality of female threads, whereby said wing nut at least partially surrounds said pressure vent plug orifice when said wing nut and said valve body are threadably engaged, and whereby no further connection mechanism extending between said valve body and said wing nut is necessary for connecting said wing nut with said valve body, wherein said pluralities of male and female threads each include a beginning thread, whereby the start points of said beginning male and female threads are located on said valve body and said wing nut, respectively, so as enable said recess of said wing nut to align over said pressure vent plug orifice of said valve body when said wing nut and said valve body are threadably engaged.

12. The choke valve safety device of claim 11 wherein said pressure vent plug orifice is located on the circumference of said valve body relative to the start point of said beginning thread of said plurality of male threads and said recess is located on said wing nut relative to the start point of said beginning thread of said plurality of female threads to enable said recess to align over said pressure vent plug orifice when said wing nut and said valve body are threadably engaged.

13. A method of forming a union assembly that cannot be opened before releasing sufficient pressure in the union assembly, the union assembly having a union body and a removable cover, the union body having a bore and an access opening, the removable cover having a passageway, the method comprising:

forming a pressure indicating device cavity in the union body, forming a cut-out portion in the removable cover, forming a plurality of male threads around the access opening of the union body proximate to the pressure indicating device cavity by locating the start point of the beginning thread of the plurality of male threads on the union body between approximately 165 degrees and approximately 195 degrees from the centerline of the pressure indicating device cavity to enable alignment of the cut-out portion of the removable cover over the pressure indicating device cavity when the removable cover and the union body are threadably engaged, and forming a plurality of female threads around the passageway of the removable cover proximate to the cut-out portion by locating the start point of the beginning thread of the plurality of female threads on the removable cover approximately 165 degrees and approximately 195 degrees from the centerline of the cut-out portion to enable alignment of the cut-out portion over the pressure indicating device cavity of the union body when the removable cover and the union body are threadably engaged.

* * * * *